W. HONSCHEID.
PLANER CHUCK.
APPLICATION FILED SEPT. 27, 1909.
970,710.
Patented Sept. 20, 1910.
2 SHEETS—SHEET 1.
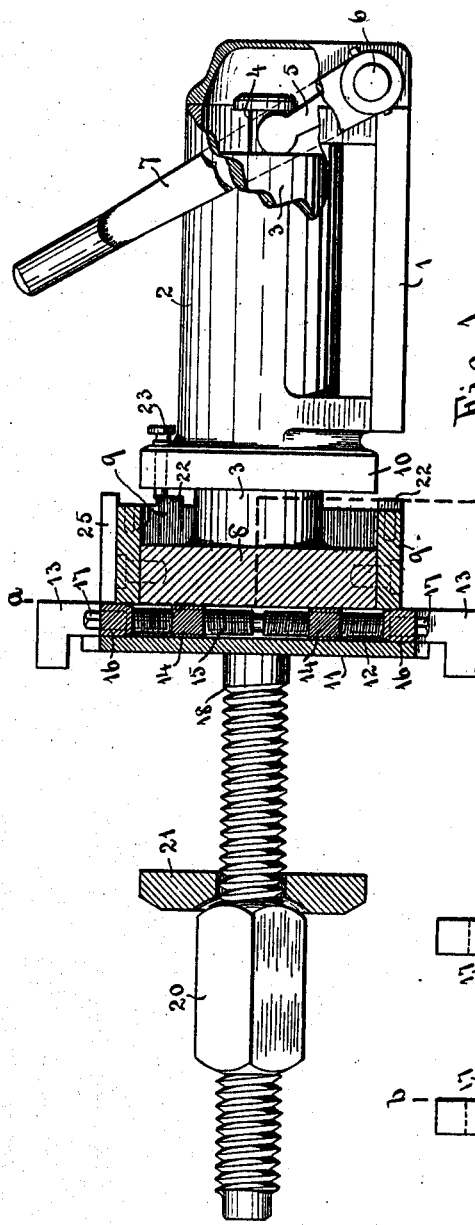
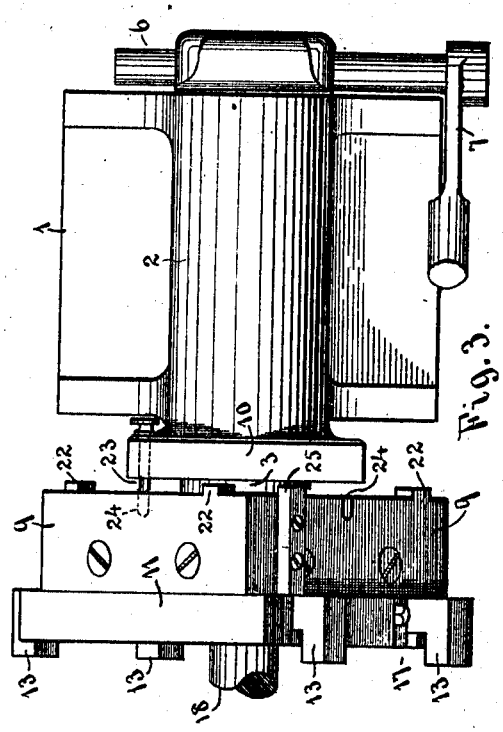
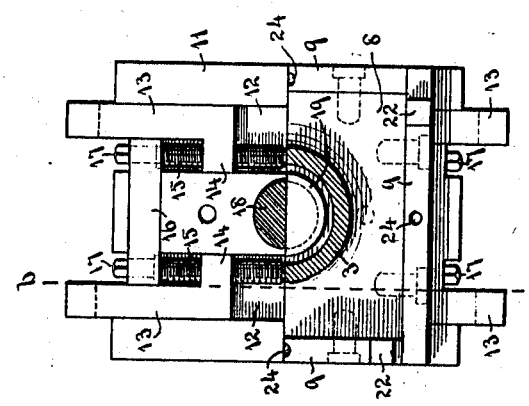
WITNESSES:
M. E. Verbick
Chas L. Stoeltzlen
INVENTOR
William Honscheid
BY
Eugene Diven
ATTORNEY W. HONSCHEID.
PLANER CHUCK.
APPLICATION FILED SEPT. 27, 1909.
970,710.
Patented Sept. 20, 1910.
2 SHEETS—SHEET 2.
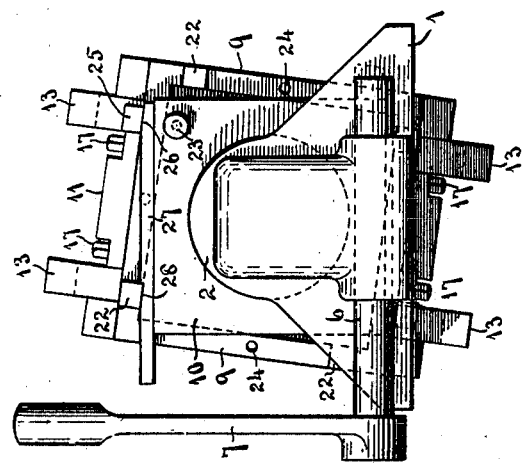
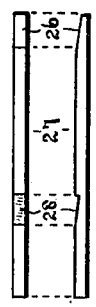
WITNESSES:
M. E. Verbeck.
Chas. L. Stoelzlen
INVENTOR
William Honscheid
BY
Eugene Aiven
ATTORNEY

UNITED STATES PATENT OFFICE.

WILLIAM HONSCHEID, OF ELMIRA, NEW YORK.

PLANER-CHUCK.

970,710.   Specification of Letters Patent.   Patented Sept. 20, 1910.

Application filed September 27, 1909. Serial No. 519,733.

*To all whom it may concern:*

Be it known that I, WILLIAM HONSCHEID, a citizen of the United States, residing at Elmira, in the county of Chemung and State of New York, have invented certain new and useful Improvements in Planer-Chucks, of which the following is a specification.

This invention relates more particularly to improvements in chucks for holding connecting rod brasses, or similar work, where the sides are to be planed to true angles and dimensions; and the object of my present invention is to provide improvements in the chuck previously devised by me, and for which I obtained Letters Patent of the United States March 1, 1892, No. 469,815; whereby the operation of the chuck may be greatly facilitated and the work held securely in the chuck while under planing operations.

A further object is to provide means for setting the chuck at different angles for beveling the corners of the brasses, and for planing one side of the brasses at an angle to receive an adjusting pin or wedge.

I attain my objects by constructing the chuck in the manner illustrated in the accompanying drawings, in which—

Figure 1 presents a side elevation of the chuck, with parts sectioned on the line *b—b* in Fig. 2, looking to the right; Fig. 2, a transverse section on the line *a—a* in Fig. 1, looking to the left; Fig. 3, a plan view showing the chuck set at a quartering position, as when beveling the corners of the brasses; Fig. 4, a rear elevation showing the chuck as set for cutting one side of the brasses at an angle to receive a setting-up wedge; and Fig. 5, a detail showing the bar to be used for this adjustment.

Like numerals designate like parts in the several views.

For attachment to the planer table, the chuck is provided with a base-plate 1, above which is a tubular support 2, in which a spindle 3 is mounted, said spindle being susceptible of both rotary and longitudinal movements in the support. At its rearward end, the spindle is provided with a grooved extension 4, which is engaged by a yoked operating arm 5 fastened to a shaft 6 which passes out through the casing at the rear of the support and is turned by means of an operating handle 7. By this means the spindle is thrown forward and back in the support, when setting the chuck in adjustment. At its forward end the spindle 3 is provided with a square head 8, around which plates 9 are fastened to form a rearwardly open square socket, which engages the correspondingly squared fixed head 10 on the support 2, when the spindle is moved inward. Attached to the outward end of the head 8 is a face-plate 11, said face-plate being provided with parallel grooves at opposite sides of its center, in which grooves there are slidably mounted two sets of oppositely disposed jaws 13. These jaws are provided at their inward ends with offsets 14, which are screwthreaded to receive the right and left adjusting screws 15. The outward ends of the screws are held in place by bearing-plates 16, set into the back of the face-plate, and are operated by means of a socket wrench applied to the squared ends 17 which project beyond the bearing-plates. Projecting from the center of the face-plate, in axial alinement with the spindle 3, is a clamping screw 18, provided with nut 20 and a swivel-plate 21; by means of which the brasses are set up tightly against the face-plate, the brasses being held against turning with reference to the face-plate by means of the jaws 13, which are set up by means of the screws 15, to engage opposite flanges of the brasses when they rest against the face-plate. When a set of brasses have thus been clamped in the chuck, the chuck will be turned on its spindle in the support until the socket on the spindle head registers with the fixed head of the support. The handle 7 will then be thrown to the rear, thereby moving the socket into engagement with the fixed head, and thus holding the work rigidly in position to have one side of the brasses planed. When this side is planed, the spindle will be run out again and the chuck given a quarter turn, when the spindle will be again run back to bring the spindle socket again into engagement with the fixed head; this operation being repeated four times to complete the planing of the four sides of the brasses. To facilitate the registration of the socket with the fixed head, I provide lugs 22 on the rearward faces of the side-plates 9, positioned one on each plate adjacent one end thereof. Thus, when the spindle is moved inward, the rear faces of the plates 9 will be brought up against the outward face of the head 10; then, by turning the chuck until the lugs 22 are brought into engagement with the sides of the head, the socket will be placed in alinement with the head.

On many of the engine brasses, as now made, it is required to bevel the edges of one of the brasses to receive the fillets on the strap, and this beveling may be done in my chuck, after the sides have been planed to the required dimensions, by setting the chuck by means of the pin 23, which is slidably mounted in one corner of the fixed head 10, said pin being adapted to engage the sockets 24 on the plates 9, when said plates are set up against the fixed head and the chuck is turned into any of its quartering positions, as shown in Fig. 3.

Where one side of the brasses is required to be cut at an angle to receive a setting up wedge or pin, I fasten on one of the socket side-plates 9 a bar 25, which projects beyond the back of the side-plate and forms a lug adapted to engage the inclined end of a bar 27 placed on top of the fixed head 10 (see Fig. 4), said bar being provided with an inclined notch at 28 to receive the lug 22 on said side-plate. The lug 25 is positioned at a greater radius from the center of the head than lug 22, and the inclines 26 and 28 are so cut in the bar that, when engaged by the lugs 22 and 25, the chuck will stand at the required angle, which is usually one and one-half inches to the foot.

In order to prevent the spindle from moving outward during the planing operations, any suitable means may be provided for locking the shaft 6 against rotation, such means, however, not being shown, as it does not enter into the invention.

The clamping screw 18 may be made integral with the spindle 3 and its head 8; but, for convenience of manufacture, I prefer making the spindle 3 hollow, as shown in Fig. 2, and pass the screw 18 through the head 8, providing the inward end of the screw with a shoulder 19 to engage the inward side of the head. The other end of the spindle 3 will be closed by the grooved extension piece 4.

Without confining myself to any particular details of construction, what I claim and desire to secure by Letters Patent is—

1. A chuck comprising a spindle provided with a head having a rearwardly open angular socket, a support in which the spindle is susceptible of both rotary and longitudinal movement, said support being provided with a fixed head shaped to receive said socket, a face-plate on the spindle head provided with two sets of laterally adjustable jaws positioned to operate parallel to one another on opposite sides of the center of the face plate, a clamping screw projecting from the face-plate in axial alinement with the spindle, and a clamping nut and plate on said screw.

2. A chuck comprising a spindle provided with a head having a rearwardly open square socket, a support in which the spindle is susceptible of both rotary and longitudinal movement, said support being provided with a fixed head squared to receive said socket, a face-plate on the spindle head provided with two parallel sets of oppositely disposed jaws slidably mounted therein on opposite sides of the center of the face-plate, right and left hand screws mounted in the face-plate for adjusting the members of each set of jaws simultaneously, a clamping screw projecting from the face-plate in axial alinement with the spindle, and a clamping nut and plate on said screw.

3. A chuck comprising a spindle provided with a head having a rearwardly open square socket, the sides of the socket being provided with rearwardly open pin sockets, a support in which the spindle is susceptible of both rotary and longitudinal movement, said support being provided with a fixed head squared to receive said socket, a longitudinally movable pin in the fixed head positioned in the circle of rotation of the pin sockets, a clamping screw projecting from the outward end of the spindle head in axial alinement with the spindle, and a clamping nut and plate on the screw.

4. A chuck comprising a spindle provided with a head having a rearwardly open angular socket, rearwardly projecting lugs on the sides of the socket adjacent the corners thereof, a support in which the spindle is susceptible of both rotary and longitudinal movement, said support being provided with a fixed head shaped to receive said socket, a clamping screw projecting from the outward end of the spindle head in axial alinement with the spindle, and a clamping nut and plate on the screw.

5. A chuck comprising a spindle provided with a head having a rearwardly open square socket, a rearwardly projecting lug on one side of the socket adjacent one end of said side, a second lug on said side adjacent its other end positioned at a greater radius from the center of the head than the first, a support in which the spindle is susceptible of both rotary and longitudinal movement, said support being provided with a fixed head squared to receive said socket, a bar adapted to be placed on one of the sides of the fixed head to engage said lugs and hold the spindle head at a certain angle, a clamping screw projecting from the outward end of the spindle head in axial alinement with the spindle, and a clamping nut and plate on the screw.

In testimony whereof I have affixed my signature, in presence of two witnesses.

WILLIAM HONSCHEID.

Witnesses:
 M. E. VERBECK,
 EUGENE DIVEN.